US007408845B2

(12) United States Patent
Ihara et al.

(10) Patent No.: US 7,408,845 B2
(45) Date of Patent: Aug. 5, 2008

(54) RADIO CORRECTED CLOCK

(75) Inventors: Takashi Ihara, Nishitokyo (JP); Masao Sakuyama, Tokorozawa (JP); Akinari Takada, Mitaka (JP); Masaaki Namekawa, Tokyo (JP)

(73) Assignee: Citizen Holdings Co., Ltd., Tokyo (JP)

( * ) Notice: Subject to any disclaimer, the term of this patent is extended or adjusted under 35 U.S.C. 154(b) by 123 days.

(21) Appl. No.: 10/487,996

(22) PCT Filed: Sep. 10, 2002

(86) PCT No.: PCT/JP02/09188

§ 371 (c)(1), (2), (4) Date: Feb. 27, 2004

(87) PCT Pub. No.: WO03/023526

PCT Pub. Date: Mar. 20, 2003

(65) Prior Publication Data

US 2004/0202051 A1 Oct. 14, 2004

(30) Foreign Application Priority Data

Sep. 10, 2001 (JP) ............................ 2001-273057

(51) Int. Cl.
*G04C 11/02* (2006.01)
*H04L 7/00* (2006.01)

(52) U.S. Cl. ........................................ 368/47; 375/356

(58) Field of Classification Search .................. 368/47, 368/46, 49, 51, 59; 375/356, 375, 364
See application file for complete search history.

(56) References Cited

U.S. PATENT DOCUMENTS 4,582,434 A * 4/1986 Plangger et al. ............... 368/46
4,768,178 A * 8/1988 Conklin et al. ................ 368/47
4,823,328 A * 4/1989 Conklin et al. ................ 368/47
5,422,863 A * 6/1995 Minowa et al. ............... 368/47
5,537,101 A * 7/1996 Nakajima et al. ...... 340/825.21
5,930,697 A * 7/1999 Bohme et al. ............... 455/315
6,288,977 B1 * 9/2001 Yoshida et al. ................ 368/47

FOREIGN PATENT DOCUMENTS

| | | | |
|---|---|---|---|
| DE | 19512285 | C2 | 10/1996 |
| EP | 0682302 | A2 | 11/1995 |
| JP | 5-142363 | A | 6/1993 |
| JP | 2554000 | Y | 11/1997 |
| JP | 30000103 | B | 1/2000 |

* cited by examiner

*Primary Examiner*—Judy Nguyen
*Assistant Examiner*—Leo T Hinze
(74) *Attorney, Agent, or Firm*—Dickstein Shapiro LLP

(57) ABSTRACT

A radio correcting timepiece that can reduce the influence of a radio wave situation of the standard radio wave having time information according to an area, and can make a correction to the exact time in a shorter time is provided. The radio correcting timepiece comprises a signal receiving means (1) for receiving a standard radio wave and a timepiece means (2) for correcting and displaying time on the basis of the time information outputted from the signal receiving means. The signal receiving means (1) can receive plural standard radio waves and includes memory means (1I) which is able to store signal receiving order of the plural standard radio waves. Since the plural standard radio waves can be received, the influence of a radio wave situation according to an area can be reduced and a correction to the exact time can be made in a shorter time by using the standard radio wave transmitted every minute.

7 Claims, 8 Drawing Sheets

RADIO CORRECTED CLOCK

TECHNICAL FIELD

This invention relates to a radio correcting timepiece having a signal receiving means for receiving a standard radio wave having time information, and a timepiece means for displaying the time on the basis of the time information outputted from this signal receiving means. This invention particularly relates to its receiving system.

BACKGROUND ART

JP-A-11-160464 conventionally discloses a solar energy operating type wireless control timepiece and JP-A-2001-166071 discloses a self electricity generating type electronic timepiece. Each timepiece receives the standard radio wave including the time information of high accuracy such as a year, a month, a day, an hour, a minute, a correct second, summer time information, etc. transmitted every one minute as a technique for receiving time data from the exterior and correcting the time displayed at present, and automatically makes a time correction as time setting, a date correction, etc.

In Japan, the standard radio wave is transmitted at present from a transmission station located in Fukushima prefecture at a frequency of 40 KHz. However, in an area such as a Kyushu district, etc. separated by 1000 Km or more from the transmission station of the Fukushima prefecture, the intensity of an electric field is weak and there are areas unable to sufficiently receive the standard radio wave. Therefore, a new transmission station is being constructed in Saga prefecture of Japan in the year of 2001. The frequency of the standard radio wave transmitted from this transmission station of the Saga prefecture is 60 KHz, and it is necessary to switch the receiving frequency and the receiving algorithm to a receiving frequency and a receiving algorithm corresponding to this area so as to set the signal receiving range of the radio correcting timepiece to the whole country of Japan. Further, the frequency of the standard radio wave and a time code format, etc. are different in accordance with respective countries and areas. Therefore, it is necessary to switch the receiving frequency and the receiving algorithm to the receiving frequency and the receiving algorithm according to the area so as to cope with the standard radio waves.

On the other hand, JP-B-56-17629 discloses a timepiece having a correcting means using the radio wave in which the pattern of a time signal mixed with a voice signal and broadcasted from a broadcast station, etc. is stored in advance and broadcast waves from plural broadcast stations are sequentially received in a constant period, and the time correction is made by recognizing the time signal waveform. Namely, when the intensity of the electric field of the radio station is too weak to receive the signal, the signals of other broadcast stations are sequentially received in a predetermined pattern, and the signal reception of each broadcast station is repeated until the signal can be received.

However, although JP-A-11-160464 discloses the solar energy operating type wireless control timepiece and JP-A-2001-166071 discloses the self electricity generating type electronic timepiece as mentioned above, these inventions do not disclose the case that required radio wave can not be received by the difference in radio wave intensity according to the area. In the above disclosure of JP-B-56-17629, its main object is not to receive the standard radio wave including the time information of high accuracy, but is to receive one time service signal in one hour. In such a signal receiving system, where electricity saving is required as in a compact portable timepiece, it is necessary to set signal receiving periods during short times before and after a correct time. Therefore, when a large time error is caused, the case that it is difficult to automatically correct the time is caused. Further, in the construction for receiving the time signal, the next time signal is received after at least one hour has passed. Therefore, a period required for the correction is lengthened.

Therefore, an object of this invention is to provide a radio correcting timepiece which reduces the influence of a radio wave situation of the standard radio wave according to an area, and can cope with the case causing a large time error, and can make a correction to the exact time in a shorter period.

DISCLOSURE OF THE INVENTION

To achieve the above object, the present invention resides in a radio correcting timepiece comprising signal receiving means for receiving a standard radio wave having time information and timepiece means for displaying time on the basis of the time information outputted from the signal receiving means.

The signal receiving means can receive plural standard radio waves, and the radio correcting timepiece further comprises memory means able to store signal receiving order of the plural standard radio waves. Thus, since the plural standard radio waves can be received, the influence of a radio wave situation according to an area can be reduced and it is possible to cope with the case of generation of a large time error by using the standard radio wave transmitted every minute. Accordingly, a correction to exact time can be made in a shorter period.

Further, if the radio correcting timepiece further comprises rewriting means able to rewrite the signal receiving order of the plural standard radio waves stored to the memory means, a more suitable standard radio wave can be preferentially received by rewriting the signal receiving order.

Further, if the rewriting means can be operated by an external operating member in the radio correcting timepiece, a more suitable standard radio wave according to the area can be arbitrarily received.

Further, if the radio correcting timepiece further comprises judging means for judging whether each signal reception in each signal receiving order is completed or uncompleted, and the signal receiving means terminates the signal reception by a completing signal from the judging means, the signal receiving time can be further shortened and power consumption can be saved and reduced.

Further, the radio correcting timepiece may further comprise judging means for judging whether each signal reception in each signal receiving order is completed or uncompleted, and flag judging means which sets-on a flag with respect to a standard radio wave station of this order by an uncompleting signal from the judging means, and skips the signal receiving order of the standard radio wave station having the flag at the next signal receiving time, and performs the signal reception of the next signal receiving order. In this case, power consumption can be reduced in a higher degree and the signal receiving time can be shortened by making the best use of the past signal receiving hysteresis information.

Further, the radio correcting timepiece may further comprise judging means for judging whether each signal reception in each signal receiving order is completed or uncompleted, and flag judging means which sets-on a flag with respect to a standard radio wave station of this order by a signal reception completing signal of constant or more time information from the judging means, and executes the signal reception of the standard radio wave station of the signal receiving order having the flag at the next signal receiving time. In this case, power consumption can be reduced in a higher degree and the signal receiving time can be shortened by making the best use of the past signal receiving hysteresis information.

Further, if the standard radio wave received in at least one adjacent order among the signal receiving orders is selected and determined from the standard radio waves of the same frequency in the radio correcting timepiece, it is possible to shorten time taken to stabilize the amplification factor of an auto gain controller of the signal receiving means for performing setting with respect to the intensity of an electric field. Further, it is possible to shorten the time until the reception of a time code and the signal reception can be rapidly performed.

Further, the radio correcting timepiece may further comprise judging means for judging whether each signal reception in each signal receiving order is completed or uncompleted, and the completing signal of each signal receiving order from the judging means may be counted every standard radio wave station, and the rewriting means may be constructed so as to rewrite the signal receiving order at the next signal receiving time by accumulating this counting number, and the radio correcting timepiece may further comprise initializing means for initializing each of the counting number every selected and determined signal receiving time number. In this case, useless power consumption is reduced and the signal receiving time is shortened and the signal reception can be rapidly performed by setting the signal receiving order according to the frequency of a perfect success from the past signal receiving hysteresis.

BEST MODE FOR CARRYING OUT THE INVENTION

The present invention will be explained in accordance with the accompanying drawings to explain the present invention in more detail.

(1) First Embodiment Mode

Figure 1:
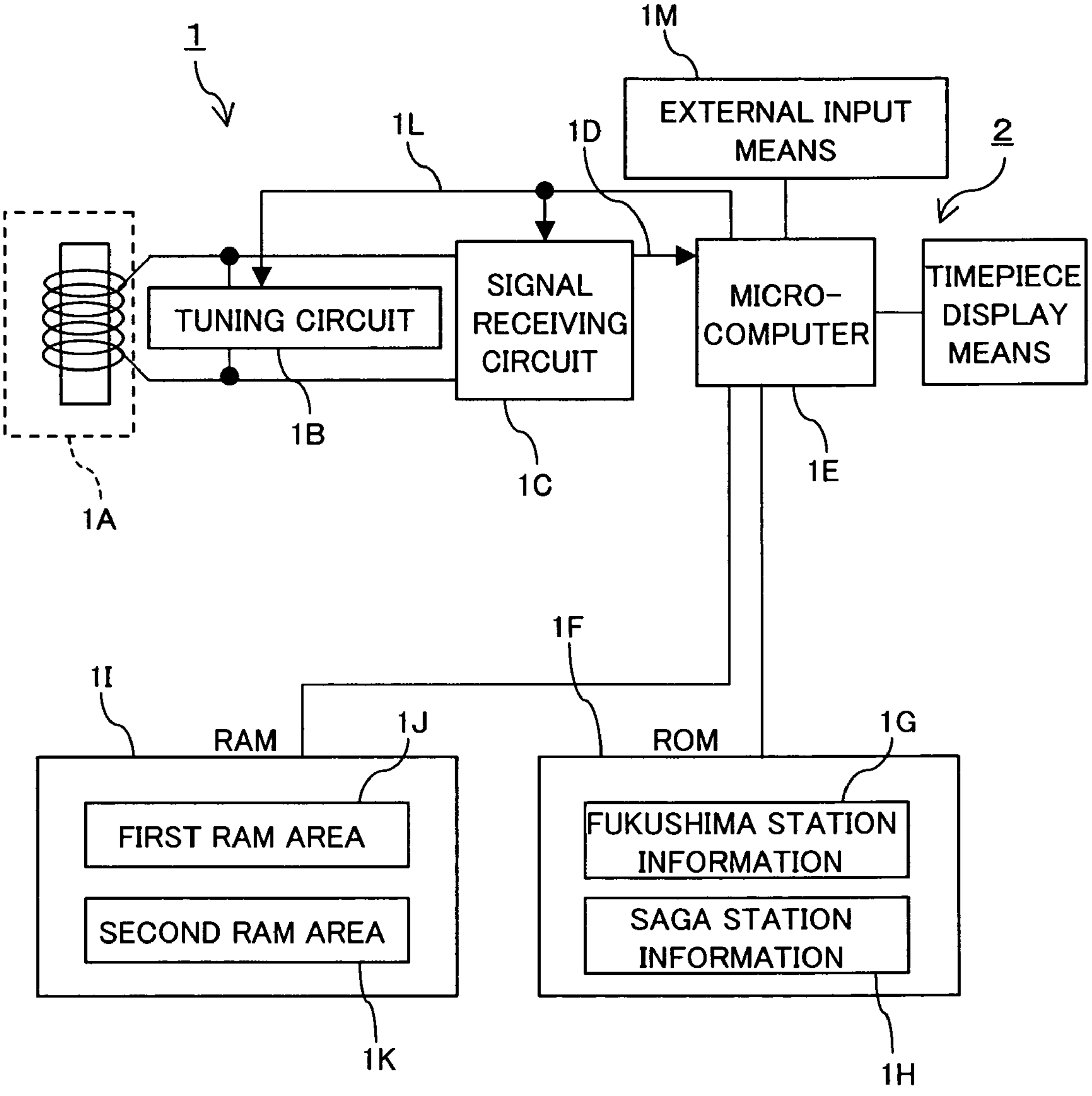
FIG. 1 is a circuit block diagram showing a first embodiment mode of a radio correcting timepiece in this invention.

FIG. 1 is a circuit block diagram showing the first embodiment mode. In a receiving means 1 of FIG. 1, an antenna 1A receives a standard radio wave and a tuning circuit 1B tunes a tuning frequency of the antenna 1A, and the standard radio wave received by the antenna 1A is converted into a digital signal by a signal receiving circuit 1C. The digital signal 1D outputted from the signal receiving circuit 1C is inputted to a microcomputer 1E for assigning a receiving frequency and decoding the digital signal 1D and making the time correction of a timepiece means 2 for displaying time. A ROM 1F stores the receiving frequency, an algorithm, information for processing time information such as a year, a month, a day, an hour, a minute, etc. The ROM 1F stores, in this embodiment mode, the contents that the frequency transmitted from Fukushima prefecture is 40 KHz, the algorithm, Fukushima station information 1G describing the information for processing the time information such as a year, a month, a day, an hour, a minute, etc. the contents that the frequency transmitted from Saga prefecture is 60 KHz, the algorithm, Saga station information 1H describing the information for processing the time information such as a year, a month, a day, an hour, a minute, etc. A RAM 1I stores the order of a transmission station for receiving a signal. The RAM 1I has a first RAM area 1J for storing the information of a transmission station for firstly performing the signal reception, and a second RAM area 1K for storing the information of a transmission station for secondly performing the signal reception. Reference numeral 1L designates a frequency selecting signal outputted to the tuning circuit 1B and the receiving circuit 1C from the microcomputer 1E. An external input means 1M, the above ROM 1F and the RAM 1I are here connected to the microcomputer 1E.

Figure 2:
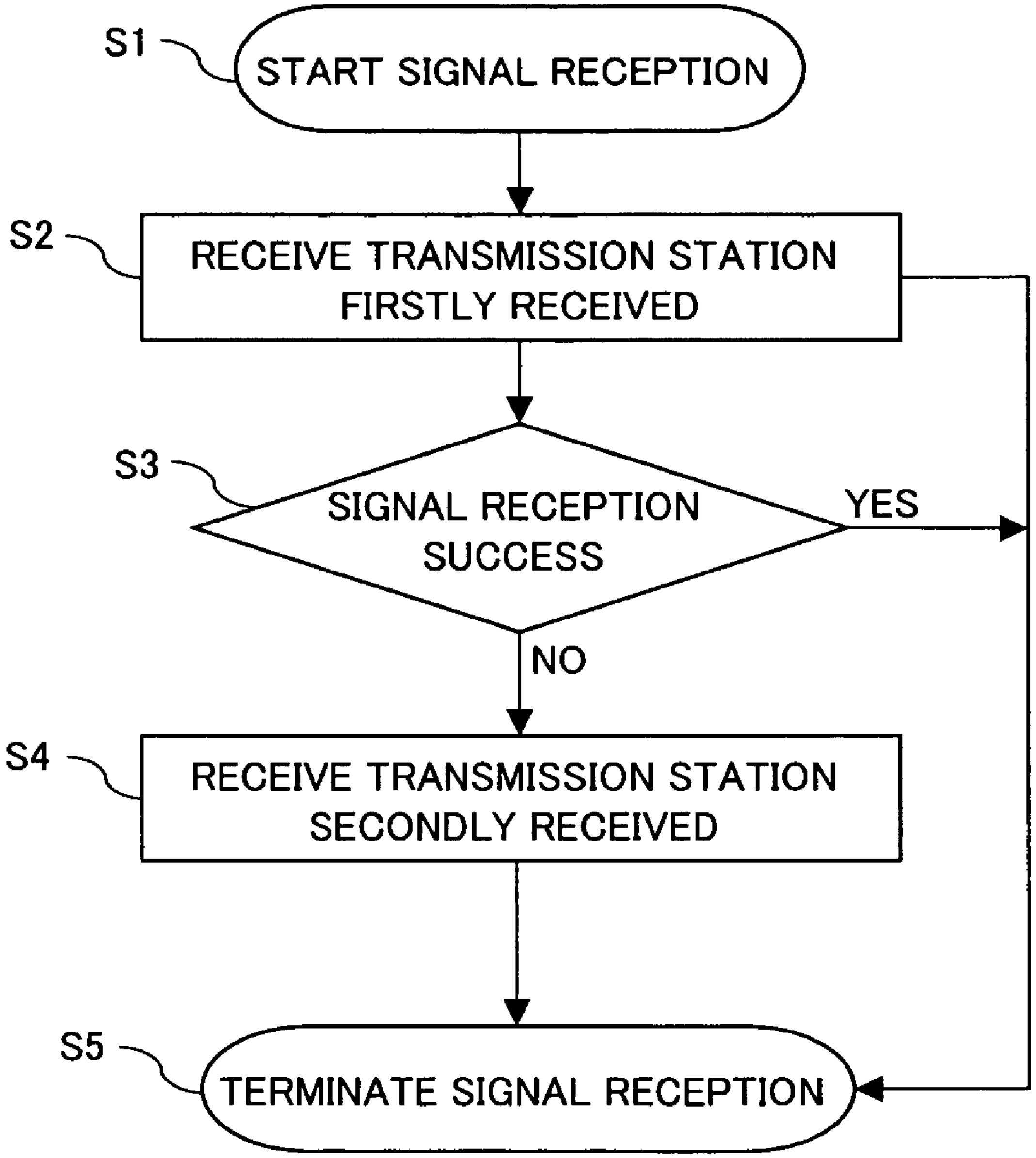
FIG. 2 is a flow chart showing a signal receiving step in the embodiment mode of FIG. 1.

FIG. 2 is a flow chart of a signal receiving step for automatically changing the receiving frequency by the radio correcting timepiece of the invention and performing the signal reception.

The signal receiving step in the invention will next be explained by using the flow chart of FIG. 2.

When the main stay place of a user is the western Japan, the user sets the Saga station to the first RAM area 1J and also sets the Fukushima station to the second RAM area 1K by using the external input means 1M in a state before the signal reception is performed.

When a signal reception starting step S1 is performed in this state, the microcomputer 1E proceeds to a step S2 in FIG. 2 in accordance with information (the same as a step of the flow chart of FIG. 2) described within the ROM 1F. The microcomputer 1E recognizes that the receiving station of the first RAM area 1J is the Saga station. The microcomputer 1E then reads Saga station information 1H within the ROM 1F, and supplies the frequency selecting signal 1L to the tuning circuit 1B and the receiving circuit 1C since the receiving frequency is 60 KHz. The microcomputer 1E then sets the receiving frequency to 60 KHz.

The standard radio wave signal of the Saga station received by the antenna 1A is converted into a digital signal 1D by the receiving circuit 1C, and is converted into time information on the basis of the Saga station information 1H by the microcomputer 1E and the time correction is made. When it is judged in a step S3 that the signal reception is successful, it proceeds to a step S5 in FIG. 2 and the signal reception is terminated. In contrast to this, when it is judged that the signal reception is unsuccessful, it proceeds to a step S4 in FIG. 2.

In the step S4, it is recognized that the receiving station of the second RAM area 1K is the Fukushima station, and the Fukushima station information 1G within the ROM 1F is read. Since the receiving frequency is 40 KHz, the frequency selecting signal 1L is given to the tuning circuit 1B and the receiving circuit 1C and the receiving frequency is set to 40 KHz.

The standard radio wave signal of the Fukushima station received by the antenna 1A is converted into a digital signal 1D by the receiving circuit 1C, and is also converted into time information on the basis of the Fukushima station information 1G by the microcomputer 1E, and the time correction is made. It proceeds to the step S5 by the passage of a constant time irrespective of the success and unsuccess of the signal reception in the step S4, and the signal reception is terminated.

Since the user here stays mainly in the western Japan, the time correction is terminated by one signal reception of the Saga station in most cases. However, even when the user temporarily moves to the eastern Japan in a trip, etc., the time correction can be made by second signal reception of the Fukushima station. Therefore, the accuracy of time can be secured. Conversely, when the main stay place of the user is the eastern Japan, the Fukushima station is set to the first RAM area 1J and the Saga station is set to the second RAM area 1K in advance reversely to the above explanation.

In this embodiment mode, the two receiving stations are explained as an example. However, it is possible to cope with three or more receiving stations by programming information of each of the three or more receiving stations in the ROM 1F and arranging three or more memory areas in the RAM 1I.

In accordance with the above embodiment mode, even when the user lives in any place, the user can always firstly receive a signal in the transmission station of an area in which the user mostly stays. Accordingly, the receiving time can be shortened and the consumption of receiving electric power can be greatly restrained.

(2) Second Embodiment Mode

Figure 3:
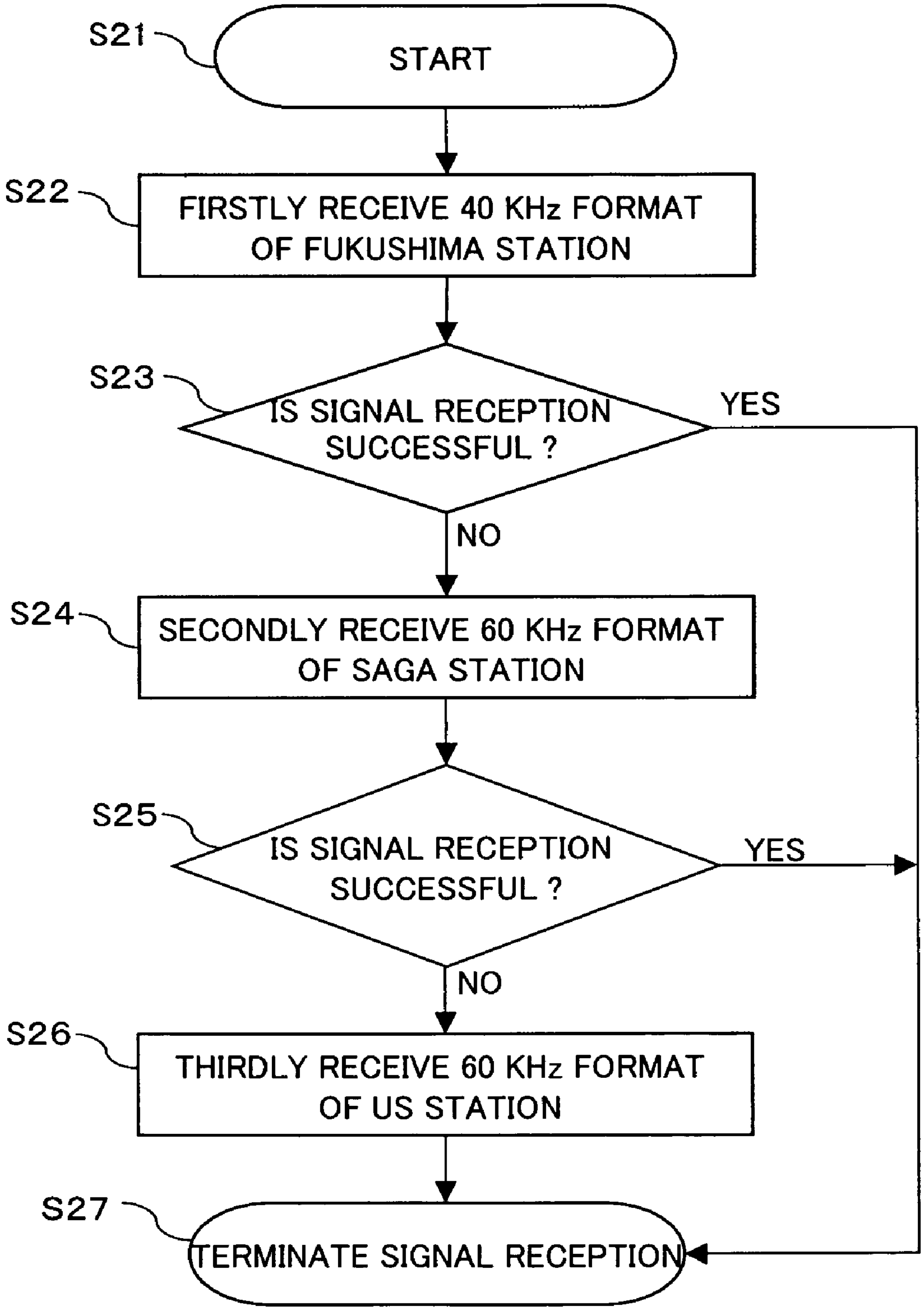
FIG. 3 is a flow chart showing a signal receiving step in a second embodiment mode of the radio correcting timepiece in this invention.

A second embodiment mode will next be explained on the basis of FIG. 3. FIG. 3 is a flow chart showing a signal receiving step in the second embodiment mode of the radio correcting timepiece in this invention.

This embodiment is an example about the radio correcting timepiece in which a signal is mainly received in Japan. A start S21 is made by a timing signal from a timepiece means, etc., and an automatic signal receiving state is started in a step S22. First, the signal reception of the 40 KHz format of the Fukushima station is tried. When it is judged in a step S23 that the signal reception is unsuccessful and the judgment is NO, the signal reception of the 60 KHz format of the Saga station is subsequently tried in a step S24. Further, when the signal reception is unsuccessful and the judgment is NO in a step S25, the signal reception of a 60 KHz format of a US station is tried in a step S26. In this example, the signal reception is terminated in a step S27 irrespective of this trial result. In contrast to this, when the signal reception is successful and the judgment is YES in the step S23 or S25, it immediately proceeds to the step S27 and the signal reception is terminated. However, a judging step for judging whether the signal reception is successful or not may be inserted after the step S26, and it may be returned to the step S22 and the signal reception may be again performed in the case of NO in the judgment of this judging step. In contrast to this, in the case of YES, it proceeds to the step S27 and the signal reception is terminated.

When the 40 KHz format and the 60 KHz format are switched, it generally takes about 30 seconds to stabilize the operation of an auto gain controller of a receiving means for performing setting with respect to the intensity of an electric field. However, in this second embodiment mode, since the 60 KHz format of the US station is set after the 60 KHz format of the Saga station, the time until the reception of a time code can be shortened and the signal reception can be rapidly performed when the receivable standard radio wave station is set to the 60 KHz format of the US station.

(3) Third Embodiment Mode

Figure 4:
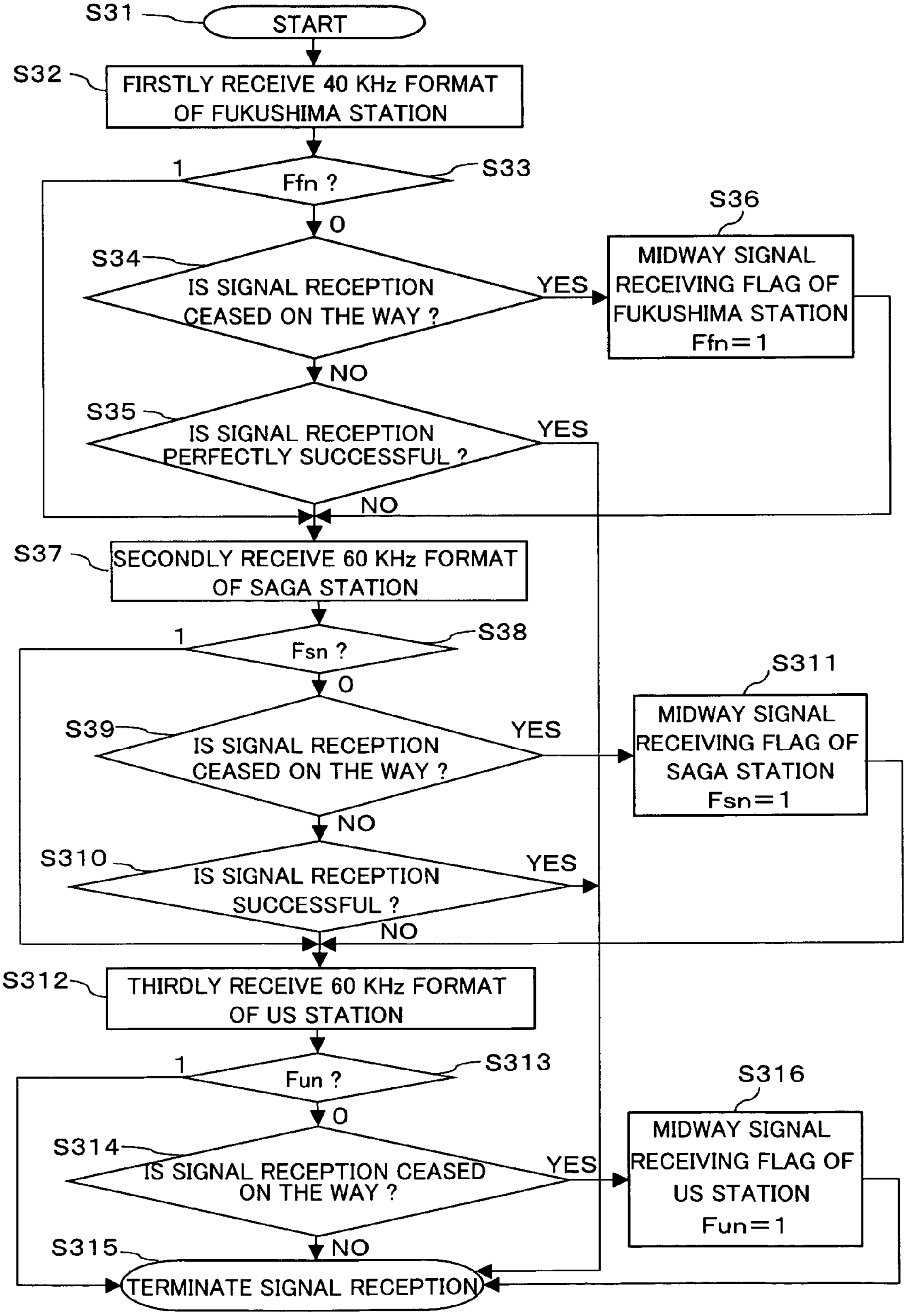
FIG. 4 is a flow chart showing a signal receiving step in a third embodiment mode of the radio correcting timepiece in this invention.

A third embodiment mode will next be explained on the basis of FIG. 4. FIG. 4 is a flow chart showing a signal receiving step in the third embodiment mode of the radio correcting timepiece in this invention.

In this example, the signal reception of a station having a ceasing hysteresis on the way in the signal reception is not tried but passed at the next signal receiving time, and it proceeds to the signal reception of the next station.

A start step S31 is started by a timing signal from a timepiece means, etc., and an automatic receiving state is started in a step S32 and the signal reception of the 40 KHz format of the Fukushima station is intended to be first tried. It is judged in a step S33 whether a midway signal receiving flag Ffn corresponding to the Fukushima station described later is 1 or 0. If this flag is 1, this station is passed. In contrast to this, if this flag is 0, the signal reception is started and it is judged in a step S34 whether the signal reception is ceased on the way or not after a constant time. If this judgment is YES, the flag of 1 is set in the midway signal receiving flag Ffn, and it proceeds to a step S37 and the signal reception of the 60 KHz format of the Saga station in the next order is intended to be tried. On the other hand, if the judgment is NO in the step S34 for judging whether the signal reception is ceased on the way or not, no flag of 1 is set in the midway signal receiving flag Ffn, and it is judged in a step S35 whether the signal reception is perfectly successful or not. When this judgment is NO, it proceeds to the step S37 and the signal reception of the 60 KHz format of the Saga station in the next order is intended to be tried.

After it proceeds to the step S37, it is further judged in a step S38 whether a midway signal receiving flag Fsn corresponding to the Saga station described later is 1 or 0. If this flag is 1, this station is passed. In contrast to this, if this flag is 0, the signal reception of the Saga station is started and it is judged in a step S39 whether the signal reception is ceased on the way or not after a constant time. If this judgment is YES, the flag of 1 is set in the midway signal receiving flag Fsn and it proceeds to a step S312, and the signal reception of the 60 KHz format of the US station (the standard radio wave station of the United States of America) in the next order is intended to be tried. On the other hand, if the judgment is NO in the step S39 for judging whether the signal reception is ceased on the way or not, no flag of 1 is set in the midway signal receiving flag Fsn in a step S311, and it is judged in a step S310 whether the signal reception is perfectly successful or not. When this judgment is NO, it proceeds to the step S312 and the signal reception of the 60 KHz format of the US station in the next order is intended to be tried.

After it proceeds to the step S312, it is further judged in a step S313 whether a midway signal receiving flag Fun corresponding to the US station described later is 1 or 0. If this flag is 1, this station is passed and the signal reception is terminated. In contrast to this, if this flag is 0, the signal reception of the US station is started and it is judged in a step S314 whether the signal reception is ceased on the way or not after a constant time. If this judgment is YES, the flag of 1 is set in the midway signal receiving flag Fun, and it proceeds to a step S315 and the signal reception is terminated. On the other hand, if the judgment is NO in the step S314 for judging whether the signal reception is ceased on the way or not, it proceeds to the step S315 without setting the flag of 1 in the midway signal receiving flag Fsn in the step S314, and the signal reception is terminated.

If the judgment is YES in the signal reception success of the above step S35 or S310, it immediately proceeds to the step S315 and the signal reception is terminated. The flag Ffn in the step S36 is initialized on the basis of predetermined state switching such as the operation of e.g., an external input means 1M, etc. after the signal reception is terminated. Similarly, the flag Fsn in the step S311 or the flag Fun in the step S316 is initialized on the basis of the predetermined state switching such as the operation of e.g., the external input means 1M, etc. after the signal reception is terminated.

In this third embodiment mode, useless power consumption is reduced and signal reception time is shortened and the signal reception can be rapidly performed by passing a predetermined station in which there is no possibility that the signal reception can be perfectly performed from the past signal reception hysteresis.

(4) Fourth Embodiment Mode

Figure 5:
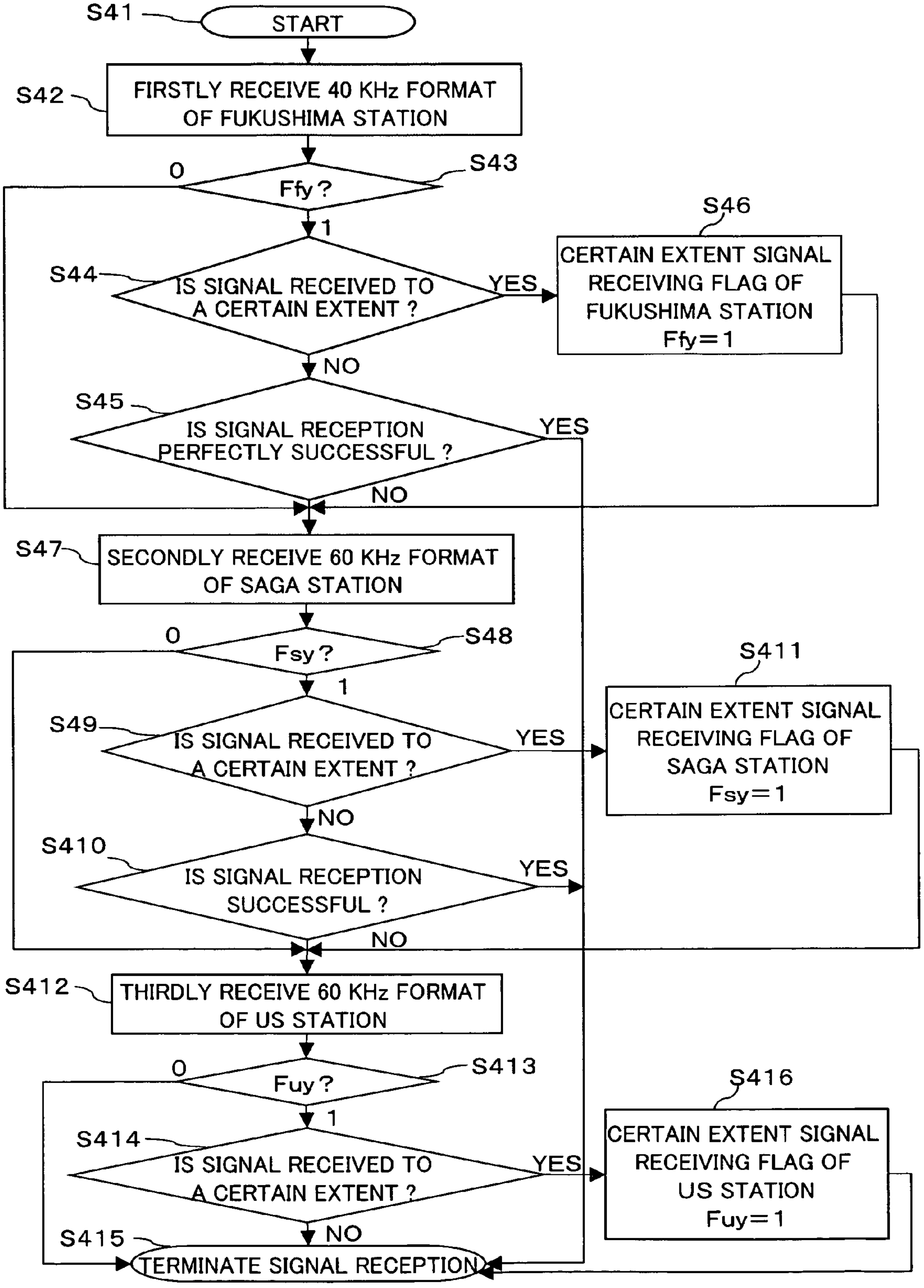
FIG. 5 is a flow chart showing a signal receiving step in a fourth embodiment mode of the radio correcting timepiece in this invention.

A fourth embodiment mode will next be explained on the basis of FIG. 5. FIG. 5 is a flow chart showing a signal receiving step in the fourth embodiment mode of the radio correcting timepiece in this invention.

In this example, on the basis of the hysteresis of the signal reception of a station able to be received to a certain extent, the signal reception is tried at the next signal receiving time since there is a possibility of the signal reception. It proceeds to the signal reception of the next station only when the signal reception is unsuccessful.

A start S41 is made by a timing signal from the timepiece means, etc., and an automatic signal receiving state is started in a step S42 and the signal reception of the 40 KHz format of the Fukushima station is intended to be first tried. It is then judged in a step S43 whether a certain extent signal receiving flag Ffy corresponding to the Fukushima station described later is 1 or 0. If this flag is 0, this station is passed. In contrast to this, if this flag is 1, the signal reception is started. It is then judged in a step S44 whether the signal reception can be performed to a certain extent or not after a constant time. If this judgment is YES, the flag of 1 is set in the certain extent signal receiving flag Ffy and it proceeds to a step S47 and the signal reception of the 60 KHz format of the Saga station in the next order is intended to be tried. On the other hand, if the judgment is NO in the step S44 for judging whether the signal reception can be performed to a certain extent or not, no flag of 1 is set in the certain extent signal receiving flag Ffy, and it is judged in a step S45 whether the signal reception is perfectly successful or not. If the judgment is NO in the step S45, it proceeds to the step S47 and the signal reception of the 60 KHz format of the Saga station in the next order is intended to be tried.

After it proceeds to the step S47, it is further judged in a step S48 whether a certain extent signal receiving flag Fsy corresponding to the Saga station described later is 1 or 0. If this judgment is 0, this station is passed. In contrast to this, if this judgment is 1, the signal reception of the Saga station is started and it is judged in a step S49 whether the signal reception can be performed to a certain extent or not after a constant time. If this judgment is YES, the flag of 1 is set in the certain extent signal receiving flag Fsy in a step S411, and it proceeds to a step S412 and the signal reception of the 60 KHz format of the US station (the standard radio wave station of the United States of America) in the next order is intended to be tried. On the other hand, if the judgment is NO in the step S49 for judging whether the signal reception can be performed to a certain extent or not, no flag of 1 is set in the certain extent signal receiving flag Fsy in the step S411, and it is judged in a step S410 whether the signal reception is perfectly successful or not. If this judgment is NO, it proceeds to the step S412 and the signal reception of the 60 KHz format of the US station in the next order is intended to be tried.

After it proceeds to the step S412, it is further judged in a step S413 whether a certain extent signal receiving flag Fuy corresponding to the US station described later is 1 or 0. If this flag is 0, this station is passed and the signal reception is terminated. In contrast to this, if this flag is 1, the signal reception of the US station is started and it is judged in a step S414 whether the signal reception can be performed to a certain extent or not after a constant time. If this judgment is YES, the flag of 1 is set in the certain middle extent signal receiving flag Fuy, and it proceeds to a step S415 and the signal reception is terminated. On the other hand, if the judgment is NO in the step S414 for judging whether the signal reception can be performed to a certain extent or not, it proceeds to the step S415 and the signal reception is terminated without setting the flag of 1 in the certain extent signal receiving flag Fuy in a step S416.

If the judgment is YES with respect to the signal reception success of the above step S45 or S410, it immediately proceeds to the step S415 and the signal reception is terminated. The flag Ffy in the step S46 is initialized on the basis of predetermined state switching such as the operation of e.g., the external input means 1M, etc. after the signal reception is terminated. Similarly, the flag Fsy in the step S411 or the flag Fuy in the step S416 is initialized on the basis of the predetermined state switching such as the operation of e.g., the external input means 1M, etc. after the signal reception is terminated.

In this fourth embodiment mode, the signal reception of a predetermined station having a possibility of the perfect success is tried from the past signal receiving hysteresis and a station having a low possibility of the signal reception success is passed in the signal reception. Thus, useless power consumption is reduced in total and the signal receiving time is shortened and the signal reception can be rapidly performed.

(5) Fifth Embodiment Mode

Figure 6:
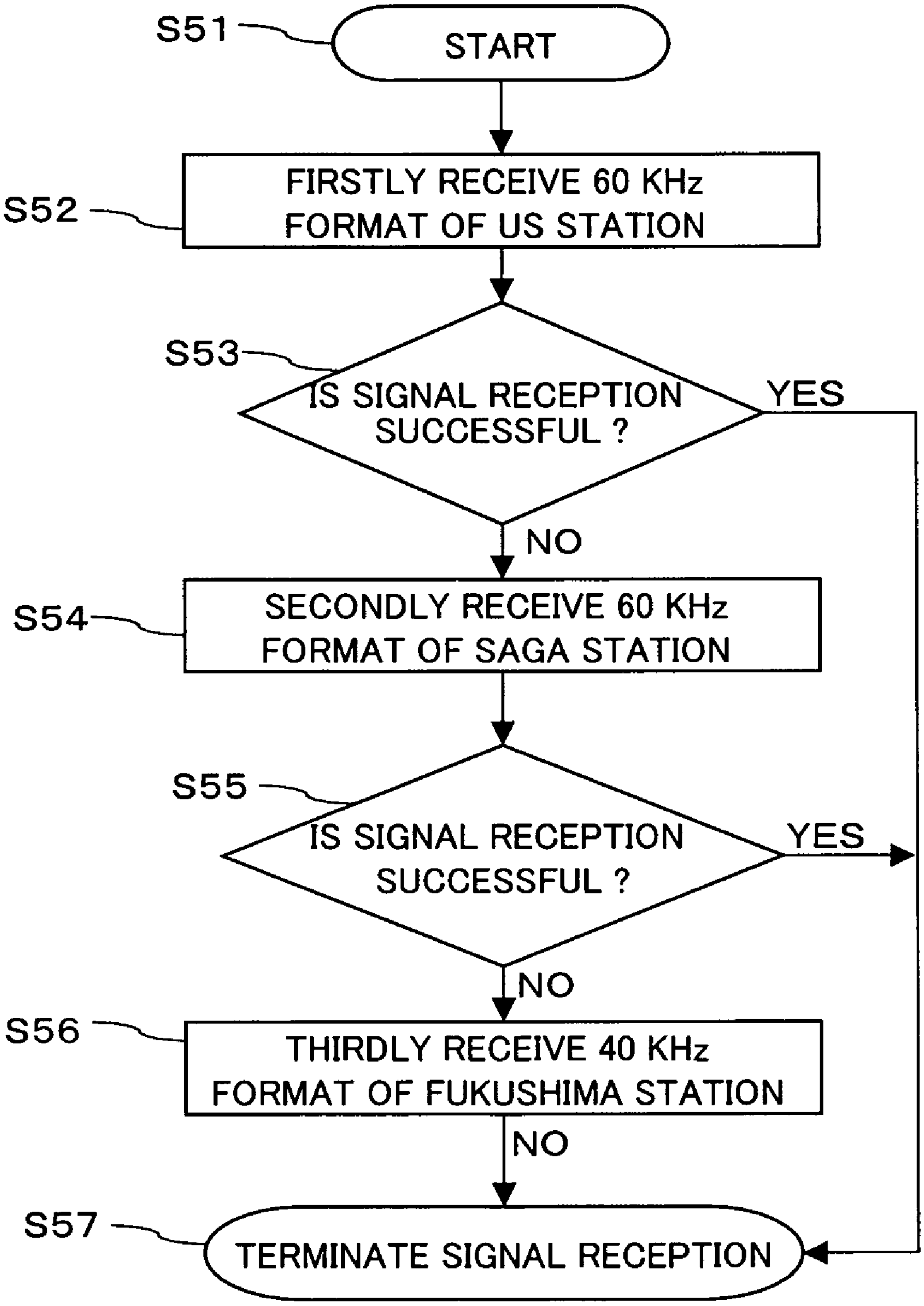
FIG. 6 is a flow chart showing a signal receiving step in a fifth embodiment mode of the radio correcting timepiece in this invention.

A fifth embodiment mode corresponding to the second embodiment mode will next be explained on the basis of FIG. 6. FIG. 6 is a flow chart showing a signal receiving step in the fifth embodiment mode of the radio correcting timepiece in this invention.

This embodiment is an example about the radio correcting timepiece with the signal reception in the United States of America as a main.

An automatic signal receiving state is started by a timing signal from the timepiece means, etc. in a step S51, and the signal reception of the 60 KHz format of the US station is first tried in a step S52. When the judgment in a step S53 is NO in the signal receiving success, the signal reception of the 60 KHz format of the Saga station is subsequently tried in a step S54. Further, when the judgment in a step S55 is NO in the signal receiving success, the signal reception of the 40 KHz format of the Fukushima station is tried in a step S56. In this example, the signal reception is terminated in a step S57 irrespective of this trial result. If the judgments in the steps S53 and S55 are YES in the signal receiving success, it immediately proceeds to the step S57 and the signal reception is terminated. However, a judging step for judging whether the signal reception is successful or not may be inserted after the step S56, and it may be returned to the step S52 in the case of NO in the judgment of this judging step and the signal re-reception may be also started. In this case, if the judgment is YES in this judging step, it proceeds to the step S57 and the signal reception is terminated.

In the switching of the 40 KHz format and the 60 KHz format, it generally takes about 30 seconds to stabilize the operation of an auto gain controller of a signal receiving means for performing setting with respect to the intensity of an electric field. However, in this fifth embodiment mode, the 60 KHz format of the Saga station is set after the 60 KHz format of the US station. Accordingly, when the receivable standard radio wave station is set to the 60 KHz format of the Saga station, the time until the reception of a time code can be shortened and the signal reception can be rapidly performed.

(6) Sixth Embodiment Mode

Figure 7:
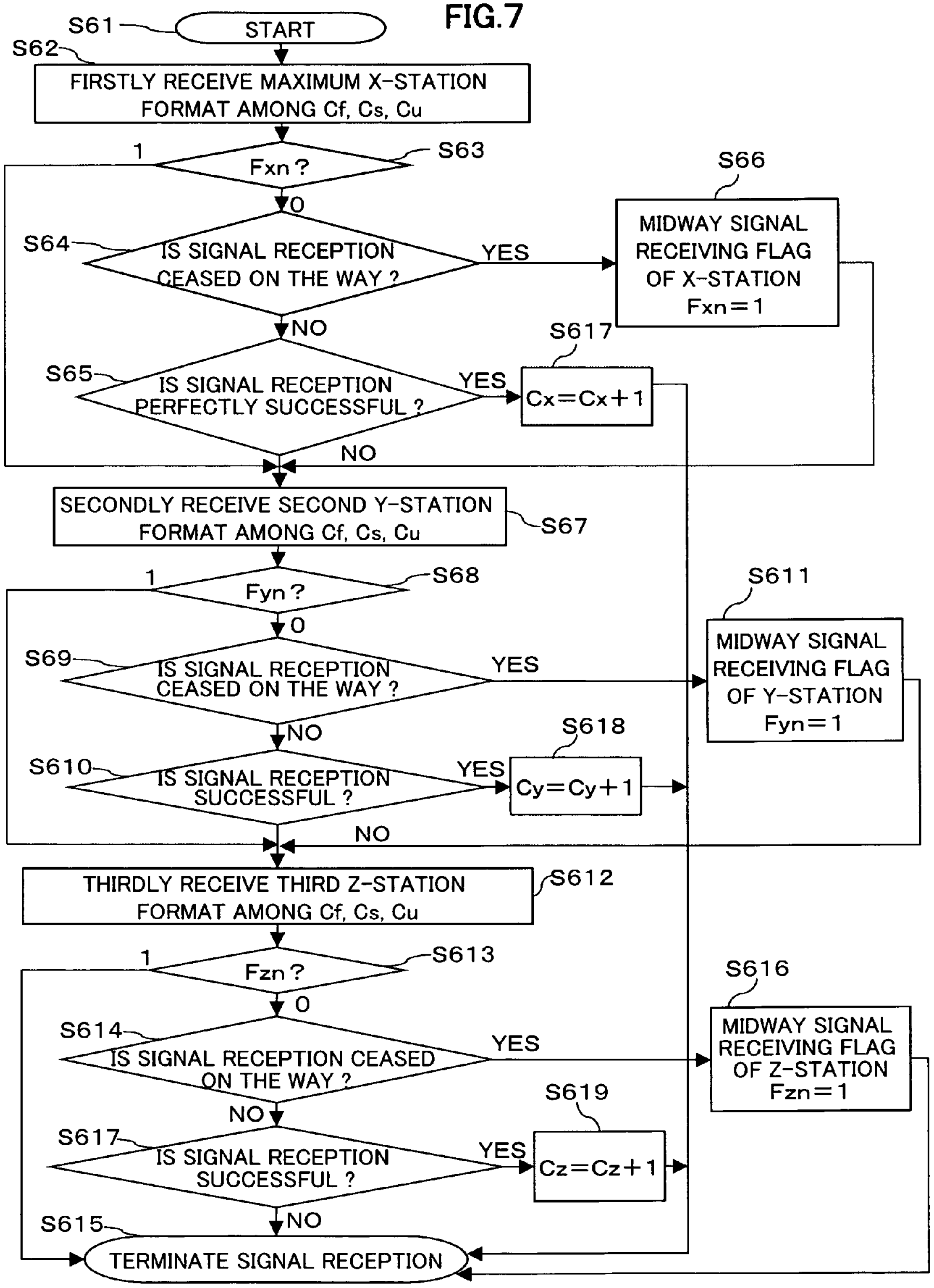
FIG. 7 is a flow chart showing a signal receiving step in a sixth embodiment mode of the radio correcting timepiece in this invention.

A sixth embodiment mode will next be explained on the basis of FIG. 7. FIG. 7 is a flow chart showing a signal receiving step in the sixth embodiment mode of the radio correcting timepiece in this invention.

In this example, the number of times of the signal receiving success of the format of each station is counted (incremented or decremented), and the signal receiving order of the formats of first, second, third, - - - stations is determined in accordance with the frequency of the signal receiving success from the past signal receiving hysteresis.

An example about the radio correcting timepiece able to receive three stations such as the 40 KHz format of the Fukushima station, the 60 KHz format of the Saga station and the 60 KHz format of the US station (the standard radio wave station of the United States of America), etc. will be explained.

A start step S61 is started by a timing signal from the timepiece means, etc., and the signal receiving state is started in a step S62, and the signal reception of an X-station having a maximum accumulating success time number of the previous hysteresis among the three stations is intended to be tried. It is then judged in a step S63 whether a midway signal receiving flag Fxn with respect to this X-station is 1 or 0. If this flag is 1, this station is passed. In contrast to this, if this flag is 0, the signal reception is started. It is then judged in a step S64 whether the signal reception is ceased on the way or not after a constant time. If this judgment is YES, the flag of 1 is set in the midway signal receiving flag Fxn in a step S66, and it proceeds to a step S67 and the signal reception of a Y-station having a second largest accumulating success time number of the previous hysteresis is intended to be tried. On the other hand, if the judgment in the step S64 for judging whether the signal reception is ceased on the way or not is NO, it is judged in a step S65 whether the signal reception is perfectly successful or not without setting the flag of 1 in the midway signal receiving flag Fxn. If this judgment is NO, it proceeds to the step S67 and the signal reception of the Y-station having the second largest accumulating success time number of the previous hysteresis is intended to be tried. When the judgment in the step S65 is YES, the value of 1 is added to the accumulating success time number Cx of the previous hysteresis in a step S617, and the entire signal reception is terminated in a step S615.

After it proceeds to the step S67 and the signal reception of the Y-station having the second largest accumulating success time number of the previous hysteresis is intended to be tried, it is judged in a step S68 whether a midway signal receiving flag Fyn corresponding to the second Y-station is 1 or 0. If this flag is 1, this station is passed. In contrast to this, if this flag is 0, the signal reception of the second Y-station is started, and it is judged in a step S69 whether the signal reception is ceased on the way or not after a constant time. If this judgment is YES, the flag of 1 is set in the midway signal receiving flag Fyn in a step S611, and it proceeds to a step S612 and the signal reception of a Z-station having the next largest accumulating success time number of the previous hysteresis is intended to be tried. On the other hand, if the judgment in the step S69 for judging whether the signal reception is ceased on the way or not is NO, it is judged in a step S610 whether the signal reception is perfectly successful or not without setting the flag of 1 in the midway signal receiving flag Fyn in the step S611. If this judgment in the step S610 is NO, it proceeds to the step S612 and the signal reception of the Z-station having the next largest accumulating success time number of the previous hysteresis is intended to be tried. When the judgment in the step S610 is YES, the value of 1 is added to the accumulating success time number Cy of the previous hysteresis in a step S618 and the entire signal reception is terminated in the step S615.

After it proceeds to the step S612 and the signal reception of the Z-station having the third accumulating success time number of the previous hysteresis is intended to be tried, it is judged in a step S613 whether a midway signal receiving flag Fzn corresponding to the third Z-station is 1 or 0. If this flag is 1, this station is passed. In contrast to this, if this flag is 0, the signal reception of the third Z-station is started and it is judged in a step S614 whether the signal reception is ceased on the way or not after a constant time. If this judgment is YES, the flag of 1 is set in the midway signal receiving flag Fzn in a step S616, and it proceeds to the step S615 and the entire signal reception is terminated. On the other hand, if the judgment in the step S614 for judging whether the signal reception is ceased on the way or not is NO, it is judged in a step S617 whether the signal reception is perfectly successful or not without setting the flag of 1 in the midway signal receiving flag Fzn in the step S616. If this judgment in the step S617 is NO, it proceeds to the step S615 and the entire signal reception is terminated. In contrast to this, when the judgment in the step S617 is YES, the value of 1 is added to the accumulating success time number Cz of the previous hysteresis in a step S619, and the entire signal reception is terminated in the step S615.

The flag Fxn in the step S66 is initialized on the basis of predetermined state switching such as the operation of e.g., the external input means 1M, etc. after the signal reception is terminated. Similarly, the flag Fyn in the step S611 or the flag Fzn in the step S616 is initialized on the basis of the predetermined state switching such as the operation of e.g. the external input means 1M, etc. after the signal reception is terminated. Further, the accumulating success time numbers Cx, Cy, Cz of the previous hysteresis are initialized every selected time number of the signal reception, e.g., every ten signal receptions.

Here, the accumulating success time numbers Cx, Cy, Cz are set to be incremented, but can be also set to be decremented.

In this sixth embodiment mode, a predetermined station having no possibility of the perfect signal reception is passed by the past signal receiving hysteresis, and the signal receiving order of the station is changed in accordance with the accumulating success time number. Thus, useless power consumption is reduced and the signal receiving time is shortened and the signal reception can be rapidly performed.

(7) Seventh Embodiment Mode

Figure 8:
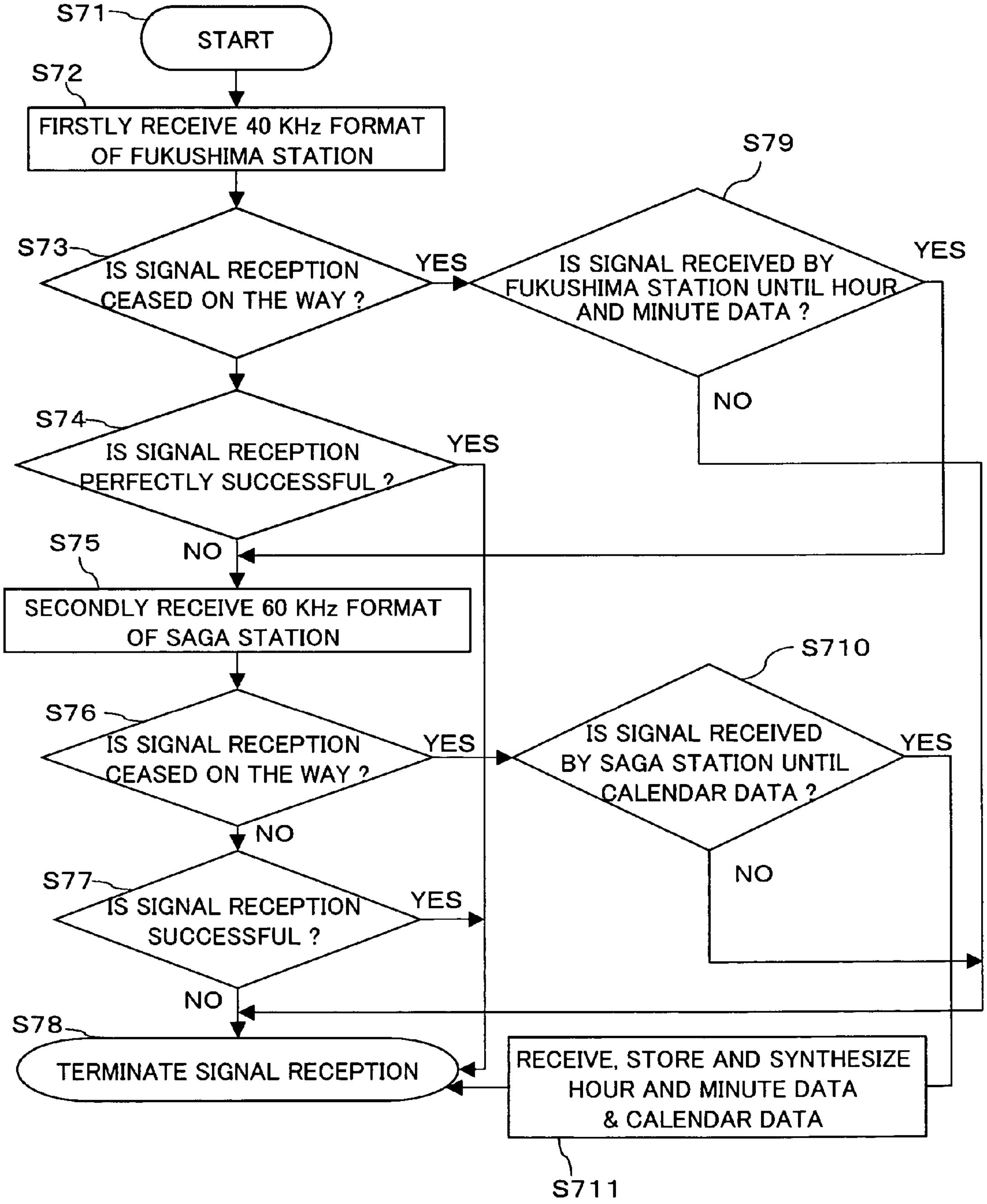
FIG. 8 is a flow chart showing a signal receiving step in a seventh embodiment mode of the radio correcting timepiece in this invention.

A seventh embodiment mode will next be explained on the basis of FIG. 8. FIG. 8 is a flow chart showing a signal receiving step in the seventh embodiment mode of the radio correcting timepiece in this invention.

In this example, when only hour and minute data are received in the 40 KHz format of the Fukushima station and only calendar data can be subsequently received in the 60 KHz format of the Saga station in the signal reception in Japan, both the data are processed as the perfect signal reception. Namely, in this example, perfect data are obtained by combining or synthesizing time information data from the two different stations.

A start step S71 is started by a timing signal from the timepiece means, etc., and an automatic signal receiving state is started in a step S72, and the signal reception of the 40 KHz format of the Fukushima station is first started. It is then judged in a step S73 whether the signal reception is ceased on the way or not after a constant time. If this judgment is YES, it is judged in a step S79 whether the signal reception can be performed until the hour and minute data. If this judgment is YES, it proceeds to the signal reception of the 60 KHz format of the second Saga station in a step S75. In contrast to this, if the judgment in the step S79 is NO, it proceeds to a step S78 and the signal reception is terminated. On the other hand, if the judgment in the step S73 is NO, it proceeds to a step S74 and it is judged whether the signal reception is perfectly successful or not. If this judging result is YES, it proceeds to a step S78 and the signal reception is terminated. In contrast to this, if the judgment in the step S74 is NO, it proceeds to the signal reception of the 60 KHz format of the second Saga station in the step S75.

In the signal reception of the 60 KHz format of the Saga station, it is judged in a step S76 whether the signal reception is ceased on the way or not after a constant time. If this judgment is YES, it is judged in a step S710 whether the signal reception can be performed until the calendar data. If this judgment is YES, it proceeds to a step S711. When the path of YES is taken in the step S79 in the first half of the flow chart, collective time information is obtained by synthesizing the signal receiving memories of the hour and minute data and the calendar data. In contrast to this, if the judgment in the step S710 is NO, it proceeds to the step S78 and the signal reception is terminated.

If the judgment in the step S76 for judging whether the signal reception is ceased on the way or not is NO, it is judged in a step S77 whether the signal reception is successful or not. When this judgment is NO, it proceeds to the step S78 and the signal reception is terminated. When the judgment is YES in the step S77, it also proceeds to the step S78 and the signal reception is terminated.

Thus, it is possible to raise a receivable frequency in the area of a boundary of the 40 KHz format of the Fukushima station and the 60 KHz format of the Saga station in the situation of a radio wave, and a signal receiving success ratio can be improved in total.

INDUSTRIAL APPLICABILITY

As mentioned above, the radio correcting timepiece of the present invention is useful as a timepiece of higher accuracy in which the influence of the standard radio wave signal reception according to an area is reduced.

The invention claimed is:

1. A radio correcting timepiece comprising signal receiving means for receiving plural standard radio waves having time information and timepiece means for correcting time operation to display time on the basis of the time information contained in at least one standard radio wave received by the signal receiving means, wherein:

said correcting time operation operates to receive said time information according to a predetermined receiving order for each standard radio wave, and in the case of success in obtaining said time information from either of said standard radio waves or in the case of unsuccess in obtaining said time information from all of said standard radio waves operates to terminate said receiving operation, and, further in the case of said success, operates to correct the time based on the time information obtained, and, on the basis of the information related to success or unsuccess in obtaining said time information from one or plural standard radio waves obtained by said correcting time operation operated in the past, said predetermined receiving order of each standard radio wave used in said correcting time operation after the past time is renewed.

2. The radio correcting timepiece according to claim 1, wherein said information related to success or unsuccess in obtaining said time information shows the number of whether said time information is successfully obtained or not in each standard radio wave, and wherein said radio correcting timepiece sets said predetermined order in accordance with the number of counts that is counted as the number of times of said success for each of said standard radio waves.

3. The radio correcting timepiece according to claim 1, wherein said radio correcting timepiece sets said predetermined order by setting whether or not said signal reception to obtain said time information is performed with respect to the each standard radio wave.

4. The radio correcting timepiece according to claim 3, wherein the radio correcting timepiece further comprises:

judging means for judging whether each signal reception to obtain said time information in each standard radio wave is completed or uncompleted; and a first flag judging means which sets-on a first flag with respect to a standard radio wave station of this receiving order by an uncompleting signal from said judging means, and said information related to success or unsuccess in obtaining said time information is said first flag;

wherein said radio correcting timepiece sets whether or not the standard radio wave is received, skipping the standard radio wave station having said first flag at the next signal receiving time, to obtain said time information.

5. The radio correcting timepiece according to claim 3, wherein the radio correcting timepiece further comprises:

judging means for judging whether each signal reception to obtain said time information in each standard radio wave is completed or uncompleted; and a second flag judging means which sets-on a second flag with respect to a standard radio wave station of this order by a signal reception completing signal of constant or more time information from said judging means, and said information related to success or unsuccess in obtaining said time information is said second flag;

wherein said radio correcting timepiece sets whether or not each standard radio wave is received, executing the signal reception of the standard radio wave station having said second flag only at the next signal receiving time, to obtain said time information.

6. The radio correcting timepiece according to claim 1, further comprising initializing means for initializing said information related to success or unsuccess in obtaining said time information.

7. The radio correcting timepiece according to claim 6, which comprises external input means for carrying out initializing operation of said initializing means.

* * * * *